United States Patent [19]

St. Clair

[11] 3,782,196
[45] Jan. 1, 1974

[54] TEMPERATURE COMPENSATED ROTARY GAS METER

[75] Inventor: Theodore A. St. Clair, Fairfield, Conn.

[73] Assignee: Textron Inc., Providence, R.I.

[22] Filed: Feb. 28, 1972

[21] Appl. No.: 229,943

[52] U.S. Cl. .................................................. 73/254
[51] Int. Cl. ............................................. G01f 3/08
[58] Field of Search ............ 73/194 M, 231 M, 233, 73/254, 261

[56] References Cited
UNITED STATES PATENTS
2,258,878  10/1941  Bassler ................................. 73/254
1,850,425  3/1932  Taylor .................................. 73/254
3,308,662  3/1967  Maurer ................................. 73/231

Primary Examiner—Herbert Goldstein
Attorney—Arthur A. Johnson et al.

[57] ABSTRACT

There is disclosed a rotary type gas meter having a shaft, a primary section and a secondary rotor section proportional to each other in displacement, the rotors of each section being secured to said shaft, and a temperature controlled valve means which diverts the output of the secondary rotor section proportionally to either the outlet of the primary rotor section or back to the inlet of the secondary rotor section, the proportions being such that the total flow of metered gas issuing from said meter is adjusted to a base temperature in accordance with Charles law regardless of the temperature of the flowing gas.

5 Claims, 5 Drawing Figures

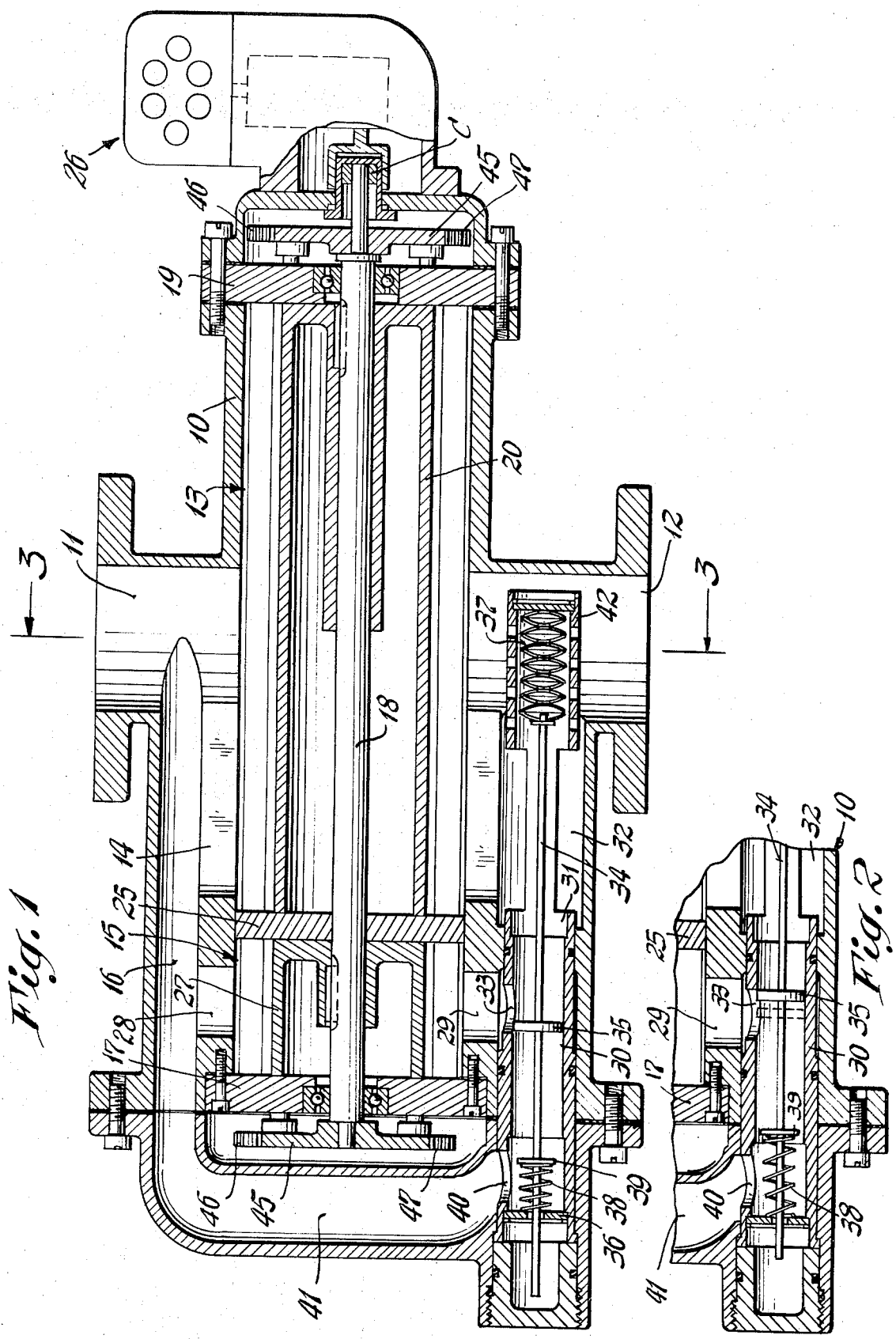

TEMPERATURE COMPENSATED ROTARY GAS METER

This invention relates to gas meters of the rotor type, and more particularly to means for compensating for variations in the temperature of the gas being metered.

As established by Charles law, when the absolute temperature of the gas increases, the volume of the gas increases and, on the contrary, when the absolute temperature of the gas decreases, the volume of the gas decreases. However, a volumetric meter as heretofore made will measure only the volume of the gas flow regardless of the temperature of the gas, indicating the true or corrected volume of the gas flow only when operating at or adjusted for a particular base temperature.

Heretofore, it was proposed to compensate for variations in the temperature of the gas flowing through the meter by means correcting the output count of the index mechanism, but such means are very expensive and lack accuracy in that the correction is applied to the full output of the meter rather than only to a percentage of the gas needing correction.

An object of the present invention is to provide means whereby the quantity of gas supplied to the customer is accurately volumetrically measured notwithstanding the variations in the absolute temperature of the gas passing through the meter.

A feature of the invention is the provision of a primary displacement means to measure a predetermined volume of gas passing through the meter at a minimum absolute temperature and to supplement the gas flowing through said primary displacement means with a quantity of gas which is equal to the difference in volume at said minimum absolute temperature and the volume of gas at the absolute temperature existing at the instant the gas is flowing.

Another important feature of this invention is the provision of means whereby the compensation for the variations in the temperature of the flowing gas is made in the meter itself, thus obviating the need for a compensating indexing device.

This is accomplished according to the present invention by providing means in a rotor-type gas meter for controlling the quantity of gas which is effective on the measuring device according to the temperature of the gas passing through the meter.

More specifically stated, in the form of the invention herein illustrated and described, the objects of the invention are attained by measuring and indexing a determinate volume of gas at a minimum absolute temperature and supplementing said volume of gas by an amount which equals the difference in volume between gas at said minimum temperature and gas at its temperature when flowing through the meter.

Although reference has been made only to rotary type meters, it is understood that the disclosure would apply to any type of positive displacement meter.

Other features and advantages will hereinafter appear.

In the accompanying drawings:

FIG. 1 is a longitudinal section of the housing of a meter and the parts contained therein in which the volume control valve is in the position which it occupies when the gas flowing through the meter is at maximum absolute temperature.

FIG. 2 shows the position of the valve when the gas is at minimum absolute temperature, the gas from the secondary gas chamber flowing back toward the inlet thereof.

Figure 3:
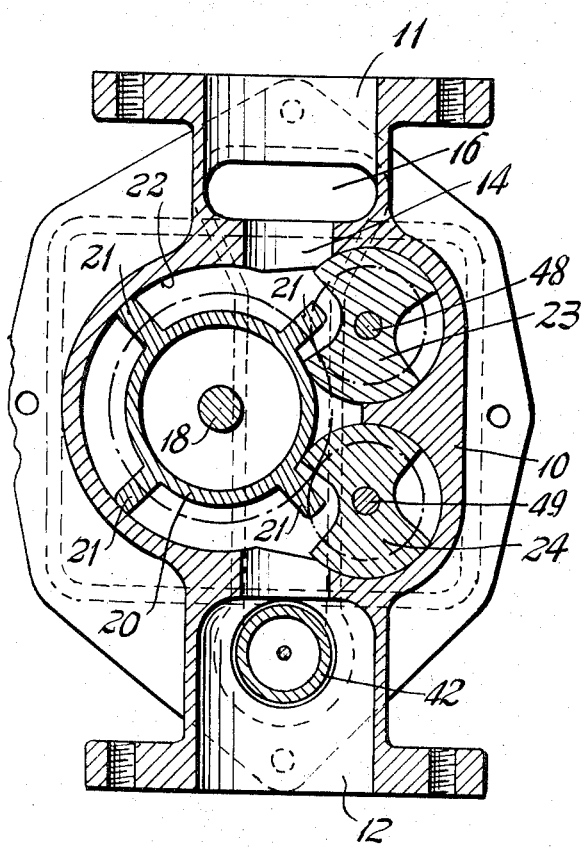
FIG. 3 is a transverse section, taken on the line 3—3 of FIG. 1, of the gas meter of the present invention showing the relationship between the rotors, the rotor valves and the inlet and outlet chambers.

As shown in the accompanying drawings, the meter of the present invention comprises a housing 10 having an inlet port 11 and an outlet port 12. The inlet port 11 communicates with a primary rotor chamber 13 through a slot 14 and with a secondary chamber 15 through a passage 16. One end of the chamber 13 is closed by a gas barrier wall 17 which supports one end of a shaft 18, the other end of which is supported by a gas barrier wall 19 at the other end of the housing 10.

Supported on the shaft 18 for rotation therewith is a primary displacement rotor 20 having radial vanes 21 engaging one side of a semicircular wall portion 22 of the housing 10, the body of the rotor 20 being engaged on the other side by rotary valves 23 and 24 whereby gas which flows through the slot 14 impinges on the vanes 21 and causes rotation of the rotor 20 counter-clockwise as shown in FIG. 3, and passes out of the housing 10 through the outlet port 12.

The length of the primary chamber 13 is defined by the wall 17 at one side and on the other side by a gas barrier wall 25 through which the shaft 18 extends. The capacity of the primary rotor 20 is such that in each revolution a predetermined unit quantity of gas at a minimum temperature flows from the inlet port 11 and slot 14 through the primary chamber 13 to the outlet port 12, and this is registered by the index mechanism 26, the outline of which is shown in FIG. 1, through a magnetic coupling C.

As far as above described, the pressure of the incoming gas being substantially constant, the volume of gas flowing through the outlet port 12 would depend on the absolute temperature of the gas rather than an exact or corrected volume for which the indexing mechanism 26 is calibrated. The corrected volume would be less at higher gas temperatures because the density would be decreased and greater at lower gas temperatures since the density would be increased. This obviously undesirable condition has been obviated in a simple and expeditious manner by the present invention. For this purpose the primary rotor 20 is designed to have a predetermined displacement for each revolution so that when the gas is at designed minimum temperature the flow of a predetermined volume of gas registered by the indexing mechanism 26 will be 5 automatically corrected to the base temperature. As gas temperature increases (and density decreases), according to the present invention, the flow from the primary rotor 20 is supplemented with an additional volume of gas proportional to the absolute temperature.

This is accomplished in the form of the invention herein disclosed by providing a secondary displacement rotor 27, mounted to shaft 18, through which a portion of the gas may flow concurrently with the flow of gas through the primary displacement rotor 20. The rotor 27 is engaged in the chamber 15 by rotary valves the same as the valves 23 and 24. In the form of the invention herein disclosed, at minimum absolute temperature the gas flowing through the secondary displacement rotor chamber 15 does not flow to the outlet port 12, but is bypassed and returned to the secondary rotor 27 through its inlet port 28. The capacity of the secondary rotor 27 is substantially equal to the difference in volume between the volume of gas at minimum temperature and the volume of gas at maximum temperature. Therefore, as the temperature of the gas increases and the density decreases, increasing amounts of gas passing through the secondary rotor pass to the outlet port 12 of the meter, said amount being thermostatically controlled.

As shown herein, the housing 10 is extended laterally so as to accommodate between the end wall 17 and the gas barrier 25 the secondary rotor 27 which is secured to the shaft 18 to rotate therewith. The displacement of the rotor 27 is proportional to that of the primary rotor 20 and may have the same number of vanes as the vanes 21 of the primary rotor and may have rotary valves mounted on the shafts 48 and 49.

In addition to the inlet port 28 which communicates with the inlet passage 16, the secondary chamber has an outlet port 29 which is controlled by a sleeve 30 having an open end 31 communicating with a passage 32 leading to the outlet port 12. The sleeve 30 is maintained in fixed position in the housing 10 and has an orifice 33 communicating with the port 29. Within the sleeve 30 there is a rod 34 carrying a valve 35 which slides on the inner surface of the sleeve 30. One end of the rod 34 is guided in a fixed disk 36 in the sleeve 30 while the other end is connected to a pile of bimetallic disks 37 referred to below. The rod 34 is urged toward the right as shown in FIGS. 1 and 2 by a spring 38 located between the guide disk 36 and a disk 39 on the rod. The sleeve 30 has an outlet port 40 opening into the bottom of a bypass conduit 41 which communicates with passage 16 and inlet port 28 of the secondary rotor 27.

When the gas flowing through the outlet port 12 is at minimum temperature, say 0° F, the valve disk 35 is in the position shown in FIG. 2 in which it blocks the flow of gas from the secondary rotor 27 to the outlet 12 and permits the full output of the secondary rotor to flow through the sleeve 30 and out of the port 40 through the bypass conduit 41 to the inlet port 28 of the secondary rotor chamber 15. As the temperature rises, the bimetallic disks 37 which are encased in an extension 42 of the sleeve 30 expand and move the valve disk 35 toward the port 40, for instance to a midway position shown in dotted lines in FIG. 2 in which part of the output of the secondary rotor 27 passes through the orifice 33, passage 32 to the outlet 12, and the other part of the gas passes through the sleeve 30, port 40 to the bypass tube 41. When the flowing gas reaches maximum temperature, say 100° F., the valve disk 35 will have moved to the position shown in FIG. 1, in which substantially the entire output of the secondary rotor 27 flows through the orifice 33, sleeve 30, passage 32 to the outlet port 12. At absolute temperatures between maximum and minimum of the gas flowing through the meter, the gas passing through the secondary rotor 27 is proportionally throttled to control the quantity of gas flow to the outlet port 12. The flow of gas through the secondary rotor 27 is made possible by controlling the size and shape of the orifice 33 so that there is greater gas pressure at the outlet port 29 than at the inlet port 28 of the rotor 27.

It should be understood that the temperatures of the gas herein mentioned are by way of examples and that the meter may be designed to respond to higher or lower absolute temperatures and to a greater range of temperatures if desired, it being merely necessary to proportion the displacement of the primary and secondary rotors according to Charles law.

Figure 4:
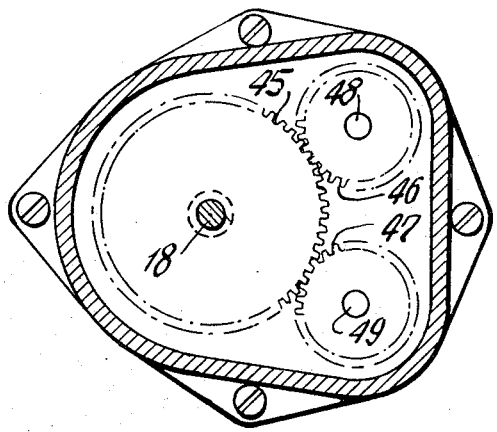
FIG. 4 is a view showing the gears between the rotor and the rotor valves.

As shown in FIG. 4, the shaft 18 has at each end a gear 45 which meshes with gears 46 and 47 on the shafts 48 and 49 on which the rotor valves 23 and 24 respectively are secured.

It should be understood that the particular heat-responsive means including the bimetal disks are shown by way of example and that any suitable heat-responsive means may be employed.

Referring to schematic FIG. 5 the principle of operation of the meter is as follows: Rotary meter A may be assumed to by a pneumatic motor and rotary meter B a pneumatic compressor driven by shaft S. The volumetric displacement relationship of meters A and B is by design a different ratio, dependent upon the temperature range to be corrected.

For example:

For a design which corrects between 0° F and 100° F:

Let $V_1$ = Unit displacement of meter A
and $V_2$ = Unit displacement of meter B
$V_{100°} = V_1 + V_2$
$V_{0°} = V_1$
$V_{100°} = V_1 (560/460) = 1.217391304 \, V_1$
$1.0000/0.217391304 = 4.6000000$ Therefore, the unit displacement of meter A should be exactly 4.6 times the displacement of meter B.

Ideally the percentage output of meter B passing through valve D into the meter outlet E would be directly proportional to the outlet absolute temperature (t), as Percent Flow$_t$ = $[(V_1) (t/460) - V_1] \, 100$ At 100° F:

$[(4.6) (560/460) - 4.6] \, 100 = 100\%$

At 0° F:

$[(4.6) (460/460) - 4.6] \, 100 = 100\%$

By inspection of the above formula it can be seen that ideally the percent flow through valve D in relation to meter B should be numerically the same as the fahrenheit temperature.

Using the above example at 0°F the gas would enter inlet F, would pass through meter A to outlet E. Sensor G would close off valve D and fully open valve H to bypass gas through meter B so that only the volumes as measured by meter A would be flowing. At 100° F valve D would be fully opened and valve H would be fully closed so that the total volumes flowing would be the sum of the displacements of meters A and B. the actual volumetric flows at these temperatures would be directly related to a specific flow at the base temperature, usually 60° F. At intermediate gas flowing temperatures valves H and D would be proportionately throttled (in actuality the positioning of valve D of FIG. 5) to add to the flow through meter A and bypass the remainder back to the inlet of meter B in accordance with flowing temperature requirements. It should be noted that the proportionality of flow rate through valves D and H remains constant regardless of the system operating pressure, since at any specific differential pressure ratio across these valves the flow rate will change by a factor of the square root of the absolute static pressure, affecting each valve equally.

Figure 5:
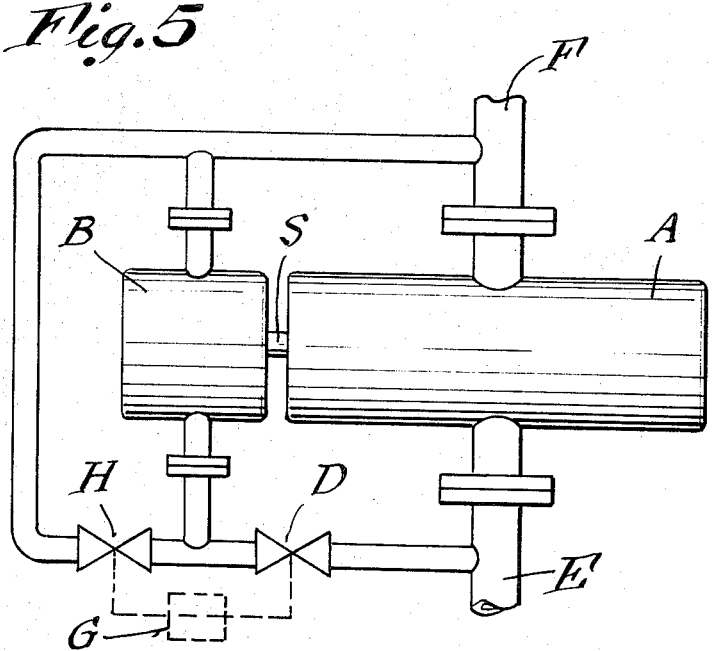
FIG. 5 is a schematic view with which to explain the principle of operation of the meter of the present invention.

It should be understood that in the schematic arrangement in FIG. 5 the valve D and the sensor G schematically represent the valve 35 and the thermostat 37 and parts connected therewith and that the percentage of flow passing through valve D in relation to flow through meter B would be directly proportional to the outlet temperature ($t$).

Variations and modifications may be made within the scope of the claims and portions of the improvements may be used without others.

I claim:

1. A rotary gas meter comprising inlet means, outlet means, primary rotor means having a capacity to meter a predetermined volume of gas flowing through the meter from the inlet means to the outlet means at a determinate minimum absolute temperature, a secondary rotor means, means connecting said primary rotor to said secondary rotor for synchronous rotation, means connecting said secondary rotor means to said inlet means and said outlet means, said secondary rotor having the capacity to flow a quantity of gas which is equal to the difference in said predetermined volume of the gas at a minimum absolute temperature and the volume of the same gas at maximum absolute temperature, temperature responsive means responsive to the absolute temperature of the gas flowing through the meter including valve means for controlling the output of said secondary rotor as a function of the difference in absolute temperature between said predetermined minimum absolute temperature and the then existing absolute temperature of the gas flowing through the meter; and indexing means connected to and responsive to the operation of said rotor means.

2. A rotary gas meter as defined in claim 1 in which said valve means is located between said secondary rotor means and said outlet means.

3. A rotary gas meter as defined in claim 1 in which the meter comprises a housing having an inlet chamber and an outlet chamber, said primary rotor means comprising a rotor chamber and a rotor and said secondary rotor means comprising a rotor chamber and a rotor; a wall separating said chambers from each other in juxtaposed positions; a shaft rotatably mounted in said housing on which both said rotors are mounted for rotation therewith; and means driven by said shaft for operating said index means.

4. A rotary gas meter as defined in claim 3, in which said secondary rotor chamber has an inlet port in communication with said inlet chamber and an outlet port in communication with said outlet chamber, and valve means controlled by said temperature responsive means to control the flow of gas from said secondary rotor chamber to said outlet means.

5. A rotary gas meter as defined in claim 4, in which there is a return duct from the outlet port of the secondary rotor chamber to the inlet port thereof, and said valve means controls the flow of gas from said outlet port of said secondary rotor chamber through said duct to said inlet port of said secondary rotor chamber.

* * * * *

PO-1050
(5/69)

UNITED STATES PATENT OFFICE
CERTIFICATE OF CORRECTION

Patent No. 3,782,196             Dated January 1, 1974

Inventor(s) Theodore A. St. Clair

It is certified that error appears in the above-identified patent and that said Letters Patent are hereby corrected as shown below:

In the Abstract, line 2, insert --rotor-- after "primary".

Column 2, line 56, omit the numeral "5".

Column 4, line 20 "by" should read --be--;
         in the formula in the last line "100%" should read --0%--;
         line 59 "the" (last occurrence) should read --The--.

Signed and sealed this 14th day of May 1974.

(SEAL)
Attest:

EDWARD M. FLETCHER, JR.
Attesting Officer

C. MARSHALL DANN
Commissioner of Patents